Jan. 19, 1943.   O. F. ZAHN   2,308,735
HOG TROUGH
Filed Sept. 19, 1942

INVENTOR
OTTO F. ZAHN

BY

ATTORNEYS

Patented Jan. 19, 1943

2,308,735

UNITED STATES PATENT OFFICE 2,308,735

HOG TROUGH

Otto F. Zahn, Sullivan, Wis., assignor to N. J. Braun Lumber Co., Sullivan, Wis.

Application September 19, 1942, Serial No. 458,957

1 Claim. (Cl. 119—53)

My invention refers to animal feeding troughs and particularly for pigs and the like.

The specific object of my invention is to provide a simple, economical and durable feed trough and oscillatory cradle hopper.

Another specific object of my invention is to provide a reenforcing beam associated with a trough having vertically extended spaced dowels or tangs extending within the feed mouth of the hopper.

A further object of my invention is to provide the cradle hopper with suspension beams embodying a rod extending therethrough and adapted to be supported in slotted standards extending upwardly from the trough, whereby the hopper may be readily removed or replaced.

With the above and other minor objects in view, the invention consists in certain peculiarities of construction and combination of parts as will be fully set forth hereinafter with reference to the accompanying drawing and subsequently claimed.

Figure 1:
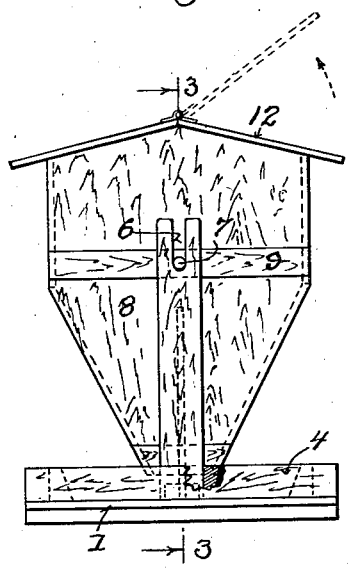
Figure 1 represents an end elevation of a hopper embodying the features of my invention.
Figure 2:
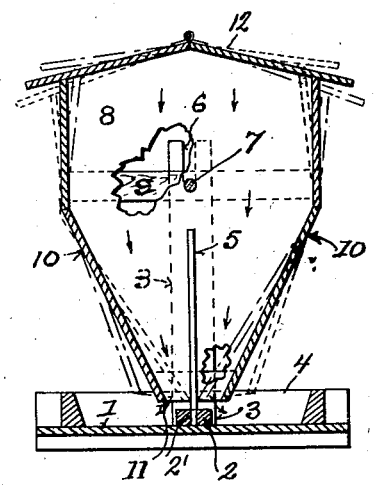
Figure 2 is a cross section of the same, the section being indicated by line 2—2 of Figure 3.
Figure 3:
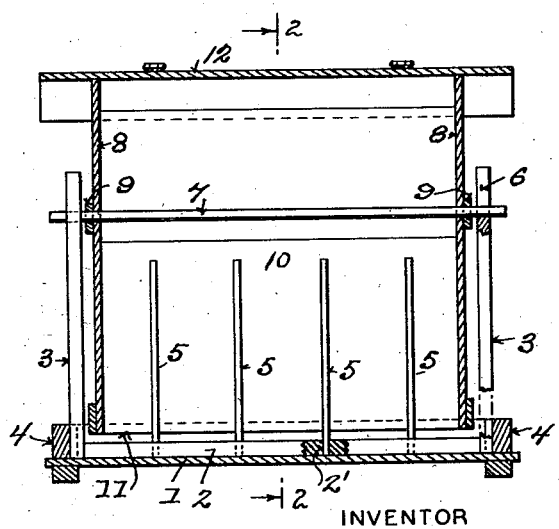
Figure 3 is a longitudinal sectional view through the trough, the section being indicated by line 3—3 of Figure 1.
Figure 3:

Referring by characters to the drawing 1 indicates the bottom of a trough having a longitudinally positioned beam 2 extending midway thereof and abutting vertical standards 3 secured and socketed in the transverse rim pieces 4 of said trough. The beam is provided with spaced apertures 2' for the reception of dowel pins or tangs 5 which project vertically to form feed projecting means, whereby the same is separated or agitated.

The upper ends of the standards 3 are provided with slots 6 for the reception of the ends of a rod 7.

The rod 7 extends through the walls 8 of a cradle hopper and said rod is also reenforced by transverse strips 9 secured to the outer faces of the hopper end walls. The strips 9 serve also as braces for the hopper walls and are spaced between the said hopper walls and the supporting standards 3, to form an anti-friction clearance space.

The lower portion of the side walls 10 of the hopper are tapered inwardly to form a restricted discharge mouth 11, which is positioned directly over the beam 2, and the tangs, as noted, extend upwardly and are engaged by the lower edges of the hopper mouth.

The receiving mouth of the hopper is provided with a two part cover 12, the same being centrally divided into panels, one of which is permanently secured to the end walls of the hopper. The companion panel is in hinged connection with the first panel whereby the same forms a swinging lid for the purpose of filling the hopper.

From the foregoing description it is manifest that when the animal is feeding, the cradle hopper will be oscillated, whereby the feed therein in conjunction with the dowel pins is agitated and caused to feed downwardly into the trough in varying volumes and movement of the hopper is limited by engagement of the side walls 10 with the tangs or dowel pins.

From the foregoing description it will be noted that an exceedingly cheap and durable hog feeding trough is produced, dispensing with complicated mechanisms. It will also be noted that the trough can be readily removed from its supporting standards and to accomplish this purpose the ends of the rod 7 project considerably beyond the supporting standards 3, whereby they form handles for lifting the hopper and inserting the same, when it is desired to clean the feeder elements.

I claim:

An animal feeder comprising a trough having transverse rim pieces, suspension standards extending upwardly from the rim pieces of the trough and having slotted upper ends, a longitudinally disposed reenforcing beam secured to the bottom of the trough and standards, the same being apertured at spaced intervals, vertically disposed dowel pins fixed in the beam apertures, a cradle feed hopper positioned over the dowel pins and having a feed mouth in juxtaposition to the beam, a horizontally disposed rod extending through the hopper and having ends journaled in the standard slots and projecting beyond the same to form handles and a two part cover for enclosing the upper filling mouth of said hopper one part being in hinged connection therewith.

OTTO F. ZAHN.